United States Patent [19]

Reizig et al.

[11] Patent Number: 4,497,192
[45] Date of Patent: Feb. 5, 1985

[54] PROCESS FOR CROPPING THE HEAD OF SELF-LUMINOUS ROLLED MATERIAL, ESPECIALLY METAL STRIPS AND SYSTEM FOR CROPPING THE HEAD

[75] Inventors: Hans-Jürgen Reizig, Duisburg; Friedrich Meuters, Mönchen-Gladbach; Hans-Richard Louen, Friedrichsfeld, all of Fed. Rep. of Germany

[73] Assignee: Thyssen Aktiengesellschaft vorm. August Thyssen-Hutte, Duisburg, Fed. Rep. of Germany

[21] Appl. No.: 451,700

[22] Filed: Dec. 20, 1982

[30] Foreign Application Priority Data

Dec. 24, 1981 [DE] Fed. Rep. of Germany ....... 3151384

[51] Int. Cl.$^3$ .................. B21B 1/00; B23D 36/00; B26D 5/34
[52] U.S. Cl. ............................... 72/203; 72/13; 83/288
[58] Field of Search ............... 72/14, 203; 83/288, 83/364, 367, 370; 358/113; 430/30

[56] References Cited

U.S. PATENT DOCUMENTS 4,384,303 5/1983 Brenke et al. .................. 358/101

FOREIGN PATENT DOCUMENTS 135608 5/1980 Japan ........................... 358/113
27913 9/1980 Japan ........................... 83/288

Primary Examiner—Lowell A. Larson
Assistant Examiner—Jorji M. Griffin
Attorney, Agent, or Firm—Sprung, Horn, Kramer & Woods

[57] ABSTRACT

The invention relates to a process for cropping the head of self-luminous rolled material, especially metal strips when it passes a rolling train. A line scanning camera is used for detecting the shape of the head by repeatedly generating optical images of the rolled material immediately downstream of the last roughing stand. The distance separating the cutting line from the beginning of the head is determined in accordance with the shape of the head. Immediately upstream a pair of shears the velocity and the beginning of the head are detected. A control signal for the shears is generated in accordance with the signals for the beginning of the head and for its velocity and with the distance of the cutting line from the beginning of the head. In order to detect the edges of the rolled material from the beginning of measurement even under wide variations of the radiation intensity the exposure time of the line scanning camera is controlled by a radiation-intensity measuring device in the sense of obtaining an optimum exposure in respect of the edges of the rolled material.

9 Claims, 2 Drawing Figures a Normal head          b Square head c Wide head          d Swallow-tail e Long head, sym          f Long head, unsym

PROCESS FOR CROPPING THE HEAD OF SELF-LUMINOUS ROLLED MATERIAL, ESPECIALLY METAL STRIPS AND SYSTEM FOR CROPPING THE HEAD

BACKGROUND OF THE INVENTION

Field of the Invention

The invention relates to a process for cropping the head of self-luminous rolled material, especially metal strips, in which process the width of the head is measured, in advance of the set of shears, along a measuring line which runs at right angles to the direction in which the rolled material runs, and the shears are controlled in accordance with this measured value.

When rolling wide strips, a roughed strip is initially produced, from a slab, for instance in a reversing stand. Before processing this roughed strip further, it is necessary to determine the width of its head, because the head has not infrequently been widened during the roughing rolling process and exceeds the initial pass-width in the finishing stand. In order to enable a roughed strip, in this condition, to be processed further, the widened head must be severed (cropped) from the remainder of the rolled material.

An unsymmetrically shaped head can also lead to difficulties during the further processing. Thus, for example, the strip can come to be skewed during the pass through the first finishing stand. Should the head of the roughed strip be markedly tapered, rolling in the finishing stand produces a strip which, over its leading portion, does not satisfy the width requirement. For these reasons, the interests of the rolling mill operator are also served by cutting off the head portion, which is not to be used, prior to the finishing rolling operations.

In both cases, however, the portion which is to be cut off, as head-scrap, should be kept as small as possible.

In order to avoid trimming either too little or too much from the head, it is necessary to determine the width of the rolled material and the shape of its head. This is conventionally effected by means of measuring instruments which function in a contact-free manner.

Methods for performing dimensional measurements on rolled material, in a contact-free manner, are known to persons skilled in the art. In one method, which is used in practice, the rolled material is back-illuminated by means of a source of parallel light, which source is located beneath the roller table, and the optical system of a known diode-type line camera generates an image of the rolled material on the camera diodes (German Offenlegungsschrift No. 2,140,939). In a camera which is suitable for carrying out this method, the diodes are charged by the incident radiation. The state of charge of the diodes is checked, in the course of which checking process they are discharged, so that they are again available for a new charging process. When a presettable charging time has elapsed, the state of charge is checked anew. The frequency at which the diodes are checked with respect to their charge is called the "sampling frequency."

In this known method for performing dimensional measurements on rolled material, in a contact-free manner, it is disadvantageous, nevertheless, that it is necessary to locate the illuminating lamps beneath the rolled material, between the rollers of the roller table. In particular, apart from the fact that the lamps are exposed to considerable amounts of thermal radiation, it is also impossible to prevent them from being damaged and contaminated by the scale which falls onto them from the rolled material.

In order to avoid these disadvantages, proposals have also already been made to utilise the radiation emitted by the rolled material itself for the width-measurement procedure. In a modern rolling mill, steels of different grades are processed into strip material. Since different grades must be rolled at different rolling temperatures, the result is that the intensities of the radiation emitted by the rolled material itself are subject to marked differences. In order to be able to perform optimum width-measurements, the exposure-adjustment system of the diode type line camera must be adjusted to suit the radiation from the rolled material which is running through the rolling train at the time in question. Additional difficulties result from the fact that the intensity of the radiation from the rolled material to be measured can decrease considerably from the middle of the material, towards the edges, so that the brightness-contrasts prevailing at the edges of the strip are frequently insufficient to enable reliable information to be obtained as to whether a photodiode in the edge-region is being disposed or not.

In order to locate the positions of the edges of the rolled material in an error-free manner, a method for measuring the width of self-luminous rolled material is known (German Offenlegungsschrift No. 2,516,756), this method being carried out with the aid of a diode-type line camera. In this method, the intensity of the radiation is measured by means of the line-camera diodes, and these measured values are conditioned for processing in a control system, the brightest point being used as the instantaneous brightness value for the control loop. The control system then adjusts the camera as a function of this conditioned measurement value. This method of adjusting the camera exposure-setting has the disadvantage that the exposure with respect to the edges of the strip, which are to be detected, is inadequate. It is accordingly necessary to provide a complicated additional device, in order to determine the abrupt change in brightness at the edges of the strip. To carry out this determination, the maximum abrupt brightness-change which is defined by the edge of the strip is initially determined in a learning procedure. This value is stored in a peak-value memory and is compared with the largest abrupt brightness-change occurring during the next measurement. Only when a corresponding abrupt brightness-change is again determined, is a trigger-pulse transmitted to a counter, which then outputs a measured value for the position of the edge of the rolled material. If, however, no abrupt brightness-change of equal magnitude is determined during the next measurement, no trigger-pulse is output to the counter, so that no measured value for the width is therefore obtained. On account of this learning procedure which, under some conditions, is constantly repeated, it is impossible to obtain measured values defining the position of the edges of the strip of rolled material from the very first measurement performed by the diode-type line camera. This disadvantage is of great importance, especially when the requirement involves the measurement of the shape of the head of the rolled material as it is running in. If, in fact, it is not possible to determine the width of the rolled material from the tip of its head, it is impossible to minimise the proportion of scrap material during the operation of cropping the head.

In a known process, the cropping operation is effected automatically, in accordance with the width of the strip, this width having been measured previously (German Offenlegungsschrift No. 2,011,276). The width of the rolled material which is running through is continuously measured at two points, these points being located at a fixed distance one from the other. As soon as the same width is determined at the two measurement points, a signal for initiating the cropping cut is transmitted to the set of shears. A process of this type is neither optimum nor, moreover, is it entirely reliable, since, depending on the shape of the head, it may be unnecessary, for the further processing, to trim off the entire head. Moreover, headshapes are conceivable in the case of which identical widths are determined at the preset measurement points, although a cut located in this region does not adequately render the beginning of the rolled material suitable for the further processing.

SUMMARY OF THE INVENTION

The object underlying the invention is to provide a process in which, depending on the shape of the head, the proportion of scrap is kept as small as possible.

This object is achieved by means of a process of the type mentioned in the introduction, in that a line scanning camera, especially a diode-type line camera, is used to detect the shape of the head by repeatedly generating optical images of the rolled material which is running through, these images being generated along the measuring line which runs immediately downstream of the last roughing stand, and the distance of the cutting line, from the beginning of the head, is afterwards determined, and in that immediately in advance of the shears, the speed at which the head runs through is sensed and the beginning of the head is detected, by means of a sensor which measures transversely across the width of the rolled material and, from the distance separating the cutting line from the beginning of the head, from the speed at which the rolled material is running through, in advance of the shears, and from the signal for the beginning of the head, a control signal is formed, which is to be transmitted to the shears.

This process can be carried out in a rolling train by a system having a set of shears which is controlled by a controlling device arranged upstream the shears and including a width-measuring device for measuring the width of the rolled material, in that the controlling device including a computer receives both signals from the width-measuring device designed as a line scanning camera, especially a diode-type line camera and is arranged immediately downstream of the last roughing stand of the rolling train and measuring repeatedly the width along a measuring line running transversely across the rolled material and signals from a speed measuring device measuring the speed of the rolled material at the measuring line and signals from a barrier, especially a further line scanning camera, especially a diode-type line camera, arranged immediately upstream the shears and detecting the beginning of the head of the rolled material along a measuring line running transversely across the rolled material and signals from a further speed measuring device measuring the speed of the rolled material upstream the shears and characterised in that the computer determines the distance separating the cutting line from the beginning of the head in accordance with the received signals for the width of the rolled material and its speed measured by the first speed-measuring device, whereby the determined distance together with the signals for the beginning of the head and its speed upstream of the shears are used to generate a control signal for the shears.

With the aid of a computer, the precise shape of the head can be determined from the measured values which have been found, and the shape can, for example, be graphically represented on a display unit. The rolling-mill operator is thereby in the position of being able to decide at which point the end of the material should be cut. However, the computer can also assume the function of evaluating the results of the measurements, in which case it determines the exact cutting line in accordance with specified criteria. Such criteria can, for example, be the point at which the width of the material being measured reaches a fixed value or, alternatively, the point at which a defined percentage of the mean strip-width is reached. The shears can be controlled with the aid of the computer. This can be accomplished for example, when the distance of the cutting line, from the beginning of the strip, is determined from the stored measurement values, and this length value is input to the control circuit of the set of shears which are located in advance of the finishing stand. It is self-explanatory that the set of shears must be coupled to an accurate length-measuring device which is placed in advance of them.

DETAILED DESCRIPTION OF THE INVENTION

Figure 1:
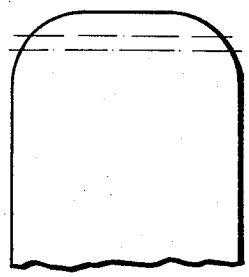
Figure 1:
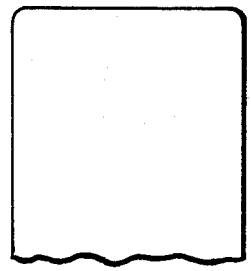
Figure 1:
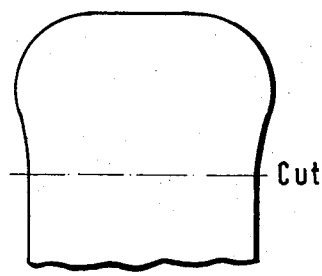
Figure 1:
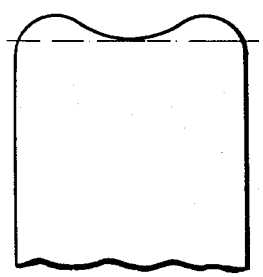
Figure 1:
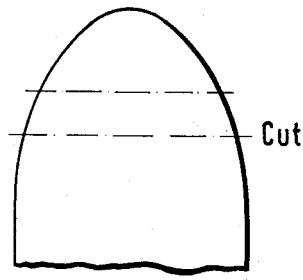
Figure 1:
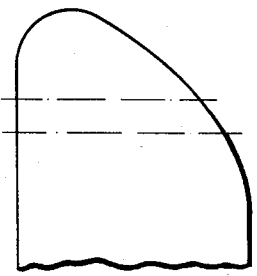

Having regard to the exact positioning of the cropping cut, the speed of the rolled material should be measured both during the width-measurement and as it runs into the shears. It is accordingly expedient for speed measurements to be made, on the strip, at these two points. This can be effected in employing conventional measuring instruments, but also by installing additional line scanning cameras. Further it is necessary to detect the beginning of the head in advance of the set of shears. A diode-type line camera, having its measuring line across the width of the rolled material is preferably used for this purpose. In this case the use of a line scanning camera has the advantage that the head, which is running in, is detected in every case, since the camera generates an image of the entire width of the roller table.

Measuring the width of the hot strip in the immediate vicinity of the last roughing stand has the advantage that incorrect measurements are largely excluded, since, in this region, the formation of scale on the rolled material is still slight and, in addition, contamination of the surface of the rolled material, by spraying water, can be excluded, since the rolled material is not subjected to cooling until a later point in time.

The shape of the head of the rolled material can be determined when the sampling frequency of the line scanning camera is adjusted in a manner such that the width of the rolled material is measured at defined intervals, and when the measurements are repeated until the same measured values are obtained over a predetermined number of successive measurements. In addition, arrangements can be made whereby, in cases, where in the evaluation of successive measurements, no excessively large deviations in the width are found, only some of the successive measurements from the individual runs through the line of the line scanning camera are evaluated. If the requirement involves the precise measurement of the shape of the head, the evaluated measurements should correspond to intervals, on the rolled material, of between 5 and 20 mm.

In order to achieve exact results in measuring the width of the self-luminous rolled material even within a large temperature range the exposure time of the line scanning camera is adjusted as a function of the intensity of the radiation from the rolled material, the intensity of this radiation being measured, in the direction in which the rolled material runs through, in advance of the measuring line of the line scanning camera, this adjustment being effected in the sense of obtaining an optimum exposure in respect of the edges of the rolled material.

The method according to the invention enables the width of the rolled material to be detected, in a precise manner, from the very first measurement. Since the measurement of the intensity of the radiation is not performed as late as the moment at which the width is measured, but chronologically and positionally earlier, and since, in addition, the method does not start from the assumption of a maximum brightness value, but starts from a signal which bears a defined relationship to the intensity of the radiation from the edge, it is ensured that, at the moment at which the width-measurement is performed, the control of the exposure-setting of the line scanning camera is optimum, that is to say the exposure with respect to the edge of the strip is neither excessive nor inadequate. It is self-explanatory that, while allowing for the speed at which the rolled material is running through, the measurement of the intensity of the radiation must be performed at an adequate distance in advance of the measuring line of the line scanning camera, and that account must be taken, in adjusting the exposure, of the running time of the rolled material between the position at which the intensity of the radiation is measured and the measuring line of the camera, because otherwise the point on the rolled material at which the intensity of the radiation has been measured would either have run through the line scanning camera already, or would not yet have reached the camera, if the exposure-adjustment had been controlled in accordance with the results of the measurement performed by the radiation-intensity meter. The exposure-time is controlled by adjusting the sampling frequency of the line scanning camera. In arriving at the optimum exposure setting for the edge of the strip, it is accepted that the exposure will not be optimum in respect of other regions, which are not of interest, in particular the middle of the strip.

The measurement of the intensity of the radiation is preferably performed on a short section of the width of the rolled material. This measurement-section can be located at any point of the rolled material. If it is located outside the region of the edges of the rolled material, in particular in the middle of the rolled material, the exposure time of the line scanning camera must be corrected in order to arrive, again, at an optimum exposure in respect of the edges of the strip. For instance, when using a diode-type line scanning camera, it was, in fact, found that, as a result of the physical properties of the semi-conductor material of the diodes of the camera, a reduction of approximately 50° K. in the temperature of the rolled material leads to a reduction of 50% in the voltage which can be measured at the diodes. Since, in practice, the edges of the strip are, as a rule, 10° to 50° K. cooler than the middle of the strip, the adjustment which enables the edges of the strip to be detected, precisely as required, can be effected if the exposure-time resulting from the measurement of the intensity of the radiation in the middle of the rolled material is corrected by a factor which is determined empirically.

It is accordingly advantageous to measure the intensity of the radiation in the middle of the rolled material, because rolled material is, in all cases, present in the region, the radiation from which can be measured, even in the event of changes in the width of the rolled material (for example, changes in the material size).

As is well-known, glowing rolled material emits radiation over a wide range of wavelengths, it being possible for the intensity of this radiation to vary very markedly as a function of its particular wavelength. In order to avoid instances of incorrect exposure-setting of the line scanning camera, particularly in respect of the region of the edges of the rolled material, the measurement of the intensity of the radiation should be performed in that wavelength region in which the line camera possesses its maximum sensitivity. The wavelength region used for the measurement of the intensity of the radiation can be limited by placing appropriate filters in front of the measuring instrument or, alternatively, by manufacturing the semiconductor layer of the measuring instrument which is used for measuring the intensity of the radiation, and is designed, for example, as a pyrometer, from the same material as the photosensitive layer of the diodes in the line scanning camera.

The measurement of the intensity of the radiation is preferably performed by means of a separate radiation-intensity meter which is arranged in the direction in which the rolled material runs through, in advance of the camera.

According to a further embodiment of the invention, it is possible to carry out the width measurement on the rolled material, at fixed intervals, even when the speed at which the rolled material runs through is variable. In this case, arrangements are made to adjust the sampling frequency of the diode-type line camera as a function of the speed at which the rolled material runs through, the optimum exposure in respect of the edge of the rolled material being maintained by matching adjustment of the radiation which is allowed to pass through to the diodes of the camera, for example by inserting diaphragms or filters.

DESCRIPTION OF AN EMBODIMENT OF THE INVENTION

Figure 2:
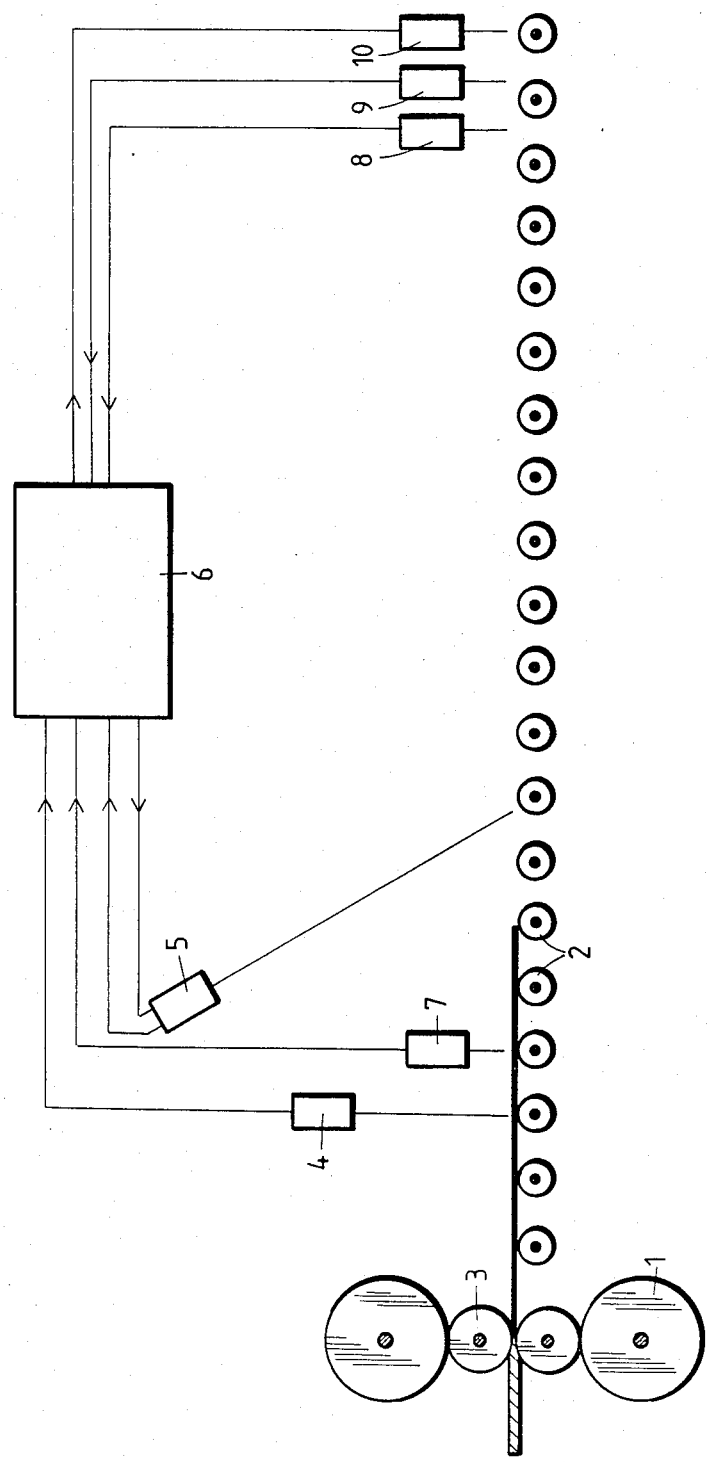

In the text which follows, the method according to the invention is explained, by way of example, with the aid of the figures in which FIG. 1 shows various head-shapes which occur on hot-rolled strip, FIG. 2 shows a diagrammatic representation of a system for cropping hot-rolled strip, this system being installed within a rolling train.

The rolled material 3 leaves a roughing stand 1 and runs onto a roller table 2, the intensity of the radiation from the middle of the rolled material being measured by means of a pyrometer 4. The exposure-time of a line scanning camera, in this example a diode-type line camera 5, is adjusted in accordance with the result of this measurement. The measuring line of the diode-type line camera 5 is located at a distance from the point at which the pyrometer 4 performs its measurement, such that the operation of adjusting the exposure-time is completed before the tip of the rolled material 3 reaches the measuring line. The pyrometer 4 and the diode-type line camera 5 are parts of a control installation 6, which also receives input from a speed-measuring device 7, which is arranged in advance of the measuring line of the diode-type line camera 5, in the direction in which the rolled material 3 runs through. If the sampling frequency of the diode-type line camera 5 is adjusted in a manner which allows for the speed of the rolled material 3, measurements can be performed on the rolled material 3 at defined intervals in space. The control installation 6 is used to control a set of shears 10, which serve to crop the rolled material 3. In order to enable the cropping operation to be carried out, it is necessary to detect the velocity of the beginning at the shears 10 by means of a velocity measuring device 8 and the running-in of the beginning of the head, this being effected by means of a barrier device, in particular by means of a diode-type line camera 9 with a measuring line running transversely across the width of the rolled material.

Various head-shapes are represented in FIG. 1, which have been determined by means of the measuring method according to the invention. The cuts, indicated in the drawing by dash/dotted lines, are positioned in accordance with these head-shapes.

What is claimed is:

1. In a process for cropping the head of the self-luminous rolled material emerging from a roughing stand which comprises:
   (A) measuring the width of the head of said rolled material upstream of a set of cropping shears along a measuring line which runs at right angles to the direction in which the rolled material runs;
   (B) controlling the shears in accordance with measured values according to step A,
   the improvement which comprises:
   (C) measuring the intensity of radiation from said rolled material in the direction in which the rolled material runs in advance of a measuring line of a line scanning camera downstream thereof;
   (D) adjusting the exposure time of said line scanning camera to obtain optimum exposure with respect to the edges of said rolled material;
   (E) detecting the shape of said head by said line scanning camera by repeatedly generating optical images of the rolled material running below said camera;
   (F) said images being generated along the measuring line which runs immediately downstream of said roughing stand;
   (G) determining the distance of the cutting line from the leading edge of said head;
   (H) determining the speed at which said head moves immediately upstream of said shears while;
   (I) determining the position of the leading edge of said head by means of a sensor which measures transversally across the width of said rolled material;
   (J) forming a control signal from:
      1. the distance separating the cutting line from the leading edge of said head;
      2. the speed at which the rolled material moves immediately upstream of said shears;
      3. the position of the leading edge of said head; and
   (K) actuating said shears in response to said control signal.

2. Process according to claim 1, characterised in that a line scanning camera, especially a diode-type line camera, is used as the sensor for detecting the beginning of the head.

3. Process according to claim 1, characterised in that for the measurement of the shape of the head, the sampling frequency of the diode-type line camera is adjusted in a manner such that the width of the rolled material is measured at intervals of 5 to 20 mm, and in that the measurements are repeated until the same measured values are obtained over a predetermined number of successive measurements.

4. Process according to claim 1, characterised in that the measurement of the intensity of the radiation is performed on a short section of the width of the rolled material.

5. Process according to claim 4, characterised in that the short measurement-section is located at a distance from the edge of the rolled material, in particular in the middle of the rolled material, and the exposure-time is corrected by a factor which is determined empirically.

6. Process according to claim 1, characterised in that the measurement of the intensity of the radiation is performed in that wavelength region in which the line scanning camera possesses its maximum sensitivity.

7. Process according to claim 1, characterised in that the sampling frequency of the line scanning camera is adjusted as a function of the speed at which the rolled material runs through, the optimum exposure in respect of the edge of the rolled material being maintained by matching adjustment of the radiation which is allowed to pass through to the line scanning camera.

8. System for cropping the head of self-luminous rolled material, especially metal strips in a rolling train having a set of shears which are controlled by a controlling device arranged upstream the shears and including a width-measuring device for measuring the width of the rolled material, characterized in that the controlling device including a computer receives both signals from the width-measuring device designed as a line scanning camera, especially a diode-type line camera, and arranged immediately downstream of the last roughing stand of the rolling train and measuring repeatedly the width along a measuring line running transversely across the rolled material and signals from a speed-measuring device measuring the speed of the rolled material at the measuring line and signals from a barrier, especially a further line scanning camera, especially a diode-type line camera, arranged immediately upstream the shears and detecting the beginning of the head of the rolled material along a measuring line running transversely across the rolled material and signals from a further speed-measuring device measuring the speed of the rolled material upstream the shears and characterized in that the computer determines the distance separating the cutting line from the beginning of the head in accordance with the received signals for the width of the rolled material and its speed measured by a first speed-measuring device, whereby the determined distance together with the signals for the beginning of the head and its speed upstream of the shears are used to generate a control signal for the shears (10), said system further comprising a radiation intensity meter positioned in advance of the measuring line of said line scanning camera and connected to said line scanning camera to control the exposure time of said line scanning camera, arrange immediately downstream of the last roughing stand, to obtain optimum exposure with respect to the edges of said rolled material.

9. System according to claim 8, characterised in that a radiation-intensity meter, in particular a pyrometer (4), is provided for the purpose of controlling the exposure-time of the line scanning camera (5), arranged immediately downstream of the last roughing stand, this meter being installed in the direction in which the rolled material (3) runs through, in advance of the measuring line of the line scanning camera (5).

* * * * *